United States Patent
Lim et al.

(10) Patent No.: US 10,268,913 B2
(45) Date of Patent: Apr. 23, 2019

(54) EQUIPMENT DAMAGE PREDICTION SYSTEM USING NEURAL NETWORKS

(71) Applicant: General Electric Company, Schenectady, NY (US)

(72) Inventors: Ser Nam Lim, Schenectady, NY (US); Arpit Jain, Niskayuna, NY (US); David Diwinsky, Cincinnati, OH (US); Sravanthi Bondugula, Niskayuna, NY (US); Yen-Liang Lin, Niskayuna, NY (US); Xiao Bian, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 107 days.

(21) Appl. No.: 15/477,517

(22) Filed: Apr. 3, 2017

(65) Prior Publication Data

US 2018/0286034 A1 Oct. 4, 2018

(51) Int. Cl.
*G06K 9/00* (2006.01)
*G06N 3/04* (2006.01)
*G06K 9/62* (2006.01)

(52) U.S. Cl.
CPC ..... *G06K 9/00973* (2013.01); *G06K 9/00771* (2013.01); *G06K 9/6284* (2013.01); *G06K 9/6296* (2013.01); *G06N 3/0454* (2013.01); *G06T 2207/20081* (2013.01); *G06T 2207/20084* (2013.01); *G06T 2207/30164* (2013.01)

(58) Field of Classification Search
None
See application file for complete search history.

(56) References Cited

U.S. PATENT DOCUMENTS

| | | |
|---|---|---|
| 5,566,092 A | 10/1996 | Wang et al. |
| 5,590,218 A | 12/1996 | Ornstein |
| 6,701,615 B2 | 3/2004 | Harding et al. |
| 6,892,127 B2 | 5/2005 | Wiseman |
| 8,761,490 B2 | 6/2014 | Scheid et al. |
| 8,768,657 B2 | 7/2014 | Goldfine et al. |
| 8,825,567 B2 | 9/2014 | Jiang et al. |

(Continued)

FOREIGN PATENT DOCUMENTS

| | | |
|---|---|---|
| CN | 104809732 A | 7/2015 |
| CN | 104914851 A | 9/2015 |

OTHER PUBLICATIONS

C. M. Bishop and J. Lasserre. 2007. Generative or discriminative? Getting the best of both worlds. In Bayesian 1397 Statistics, vol. 8. Oxford University Press, 3-23 (Year: 2007).*

(Continued)

*Primary Examiner* — Justin P. Misleh
(74) *Attorney, Agent, or Firm* — Peter A. Flynn

(57) ABSTRACT

A generative adversarial network (GAN) system includes a generator sub-network configured to examine one or more images of actual damage to equipment. The generator sub-network also is configured to create one or more images of potential damage based on the one or more images of actual damage that were examined. The GAN system also includes a discriminator sub-network configured to examine the one or more images of potential damage to determine whether the one or more images of potential damage represent progression of the actual damage to the equipment.

20 Claims, 4 Drawing Sheets

(56) References Cited

U.S. PATENT DOCUMENTS

| | | | | |
|---|---|---|---|---|
| 2005/0033555 | A1* | 2/2005 | Tanner | B23P 6/002 702/183 |
| 2013/0311968 | A1 | 11/2013 | Sharma | |
| 2017/0056928 | A1* | 3/2017 | Torrione | B07B 1/42 |
| 2017/0365038 | A1* | 12/2017 | Denton | G06T 5/00 |

OTHER PUBLICATIONS

Roberto Capata, "An Artificial Neural Network-based Diagnostic Methodology for Gas Turbine Path Analysis—Part II: Case Study", Energy, Ecology and Environment, 2016, pp. 351-359, (9 pages).

Nielsen; "Using Neural Nets to Recognize Handwritten Digits" http://neuralnetworksanddeeplearning.com/chap1.html2, Neural Networks and Deep Learning, Jan. 2017, 54 Pages.

Long; Shelhamer; Darrell; "Fully Convolutional Networks for Semantic Segmentation", UC Berkeley, The IEEE Conference on Computer Vision and Pattern Recognition (CVPR), 2015, 10 Pages.

Li; Karpathy; "CS231n Convolutional Neural Networks for Visual Recognition", http://cs231n.github.io/neural-networks-1/, 2015, 15 pages.

Karpathy; "CS231n Convolutional Neural Networks for Visual Recognition, Convolutional Neural Networks (CNNs / ConvNets)" http://cs231n.github.io/convolutional-networks/, 26 pages.

Goodfellow; Pouget-Abadie; Mirza, Xu, Warde-Farley; Ozair; Courville; Benglo; "Generative Adversarial Nets", D'epartement d'informatique et de recherche op'erationnelle Universit'e de Montr'eal Montr'eal, QC H3C 3J7, Jun. 10, 2014, 9 pages.

Mathieu, M., et al., "Deep multi-scale video prediction beyond mean square error," Computer Vision and Pattern Recognition, pp. 1-14 (2015).

Staszewski, W.J., "Intelligent signal processing for damage detection in composite materials," Composites Science and Technology, vol. 62, Issues 7-8, pp. 941-950 (2002).

Extended European Search Report and Opinion issued in connection with corresponding EP Application No. 18165505.1 dated Jul. 11, 2018.

Office Action issued in connection with corresponding CA Application No. 2998887 dated Jan. 4, 2019.

\* cited by examiner

EQUIPMENT DAMAGE PREDICTION SYSTEM USING NEURAL NETWORKS

FIELD

The subject matter described herein relates to image analysis systems that use one or more neural networks.

BACKGROUND

Equipment can become worn over time and, eventually, fail. For example, blades in turbines may develop spalls or cracks over time, which can lead to catastrophic failure of the turbines and/or significant downtime of the turbines if the damage is not discovered sufficiently early to avoid significant repair or replacement of parts in the turbines. Some known systems and methods can visually inspect the components of equipment in order to identify damage to the equipment.

But, these systems and methods have certain faults. As one example, the characterization of the damage appearing in images or video of the equipment can be highly subjective and prone to error. As another example, determination of the severity and/or likely spread of the damage can require a significant amount of information on the materials in the equipment, the environmental conditions to which the materials were exposed, the operating conditions in which the equipment operated, etc., may need to be known to accurately identify, characterize, and/or predict upcoming growth of the damage. This information may not be available for the automated analysis and/or prediction of upcoming growth or changes in damage to the equipment.

BRIEF DESCRIPTION

In one embodiment, a GAN system includes a generator sub-network configured to examine one or more images of actual damage to equipment. The generator sub-network also is configured to create one or more images of potential damage based on the one or more images of actual damage that were examined. The GAN system also includes a discriminator sub-network configured to examine the one or more images of potential damage to determine whether the one or more images of potential damage represent progression of the actual damage to the equipment.

In one embodiment, a method includes examining one or more images of actual damage to equipment using a generator sub-network of a GAN, creating one or more images of potential damage using the generator sub-network based on the one or more images of actual damage that were examined, and determining whether the one or more images of potential damage represent progression of the actual damage to the equipment by examining the one or more images of potential damage using a discriminator sub-network of the GAN.

In one embodiment, a GAN system includes a generator sub-network configured to be trained using one or more images of actual damage to equipment. The generator sub-network also is configured to create one or more images of potential damage based on the one or more images of actual damage that were examined. The GAN system also includes a discriminator sub-network configured to examine the one or more images of potential damage to determine whether the one or more images of potential damage represent progression of the actual damage to the equipment.

BRIEF DESCRIPTION OF THE DRAWINGS

The present inventive subject matter will be better understood from reading the following description of non-limiting embodiments, with reference to the attached drawings, wherein below.

DETAILED DESCRIPTION

Figure 1:
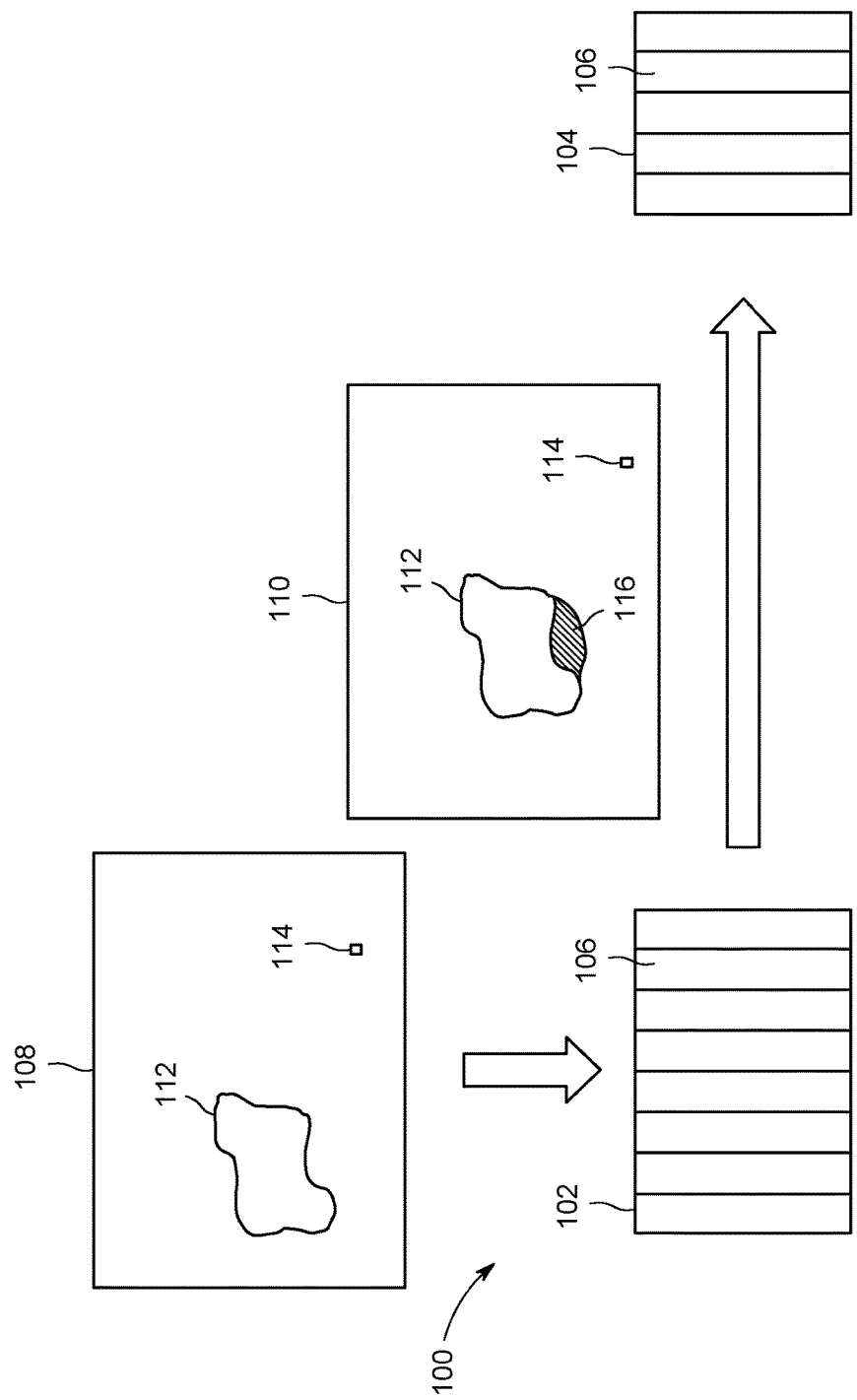
FIG. 1 illustrates one embodiment of an equipment damage prediction system.

One or more embodiments of the inventive subject matter described herein provide systems and methods that predict the growth or progression of damage to equipment. The systems and methods can predict the progression of damage to the equipment based on or using one or more images of actual damage to the same or other equipment, as well as one or more images generated by a neural network based on the image(s) of actual damage. For example, a deep generative adversarial network (GAN) system can use a large image dataset without annotation (e.g., labeling of what each pixel in the images represents) to generate high-quality images. The GAN system can be conditioned using images representative of the current stage or state of the equipment (e.g., a turbine engine blade) and be trained with images including possible developed defects to the equipment. A generator sub-network of the GAN system can create the images of possible or potential growth of the damage based on the image(s) of actual damage. The created images can be provided to a discriminator sub-network of the GAN system. The discriminator sub-network determines a loss function, error, and/or confidence value indicative of whether the image created by the generator sub-network is or likely is actual damage to the equipment. If the loss function, error, and/or confidence value indicate that the image created by the generator sub-network is similar to the image of actual damage to the equipment (e.g., the loss function or error is lower than a lower designated threshold, or the confidence value is at least as great as an upper designated threshold), then the created image can be used to characterize how damage to equipment changes over time.

Different created images can represent potential progression or worsening of damage to the equipment. For example, different created images can be associated with different degrees or stages of damage progression. Subsequent images of the same or different equipment can be compared to the created image(s). If the damage appearing in the subsequent images is similar to the potential damage appearing in the created image(s), then a determination may be made as to how quickly the damage to the equipment is progressing. This determination can be used to determine whether to modify a maintenance schedule of the equipment and, optionally, to automatically implement or perform repair or replacement of the equipment by an automated system (e.g., an automated robotic or other powered system).

The GAN system described above includes two sub-networks, namely the generator sub-network and the discriminator sub-network. These sub-networks interact in a setting of a two-player minimax game. During training, the generator sub-network attempts to learn how to produce real-looking image samples (e.g., created images) based on training images (e.g., images of actual damage) provided to the generator sub-network. The discriminator sub-network attempts to learn how to distinguish the produced image samples from the genuine (e.g., training) image samples, which are original and not produced by the generator sub-network. These sub-networks can eventually converge to an equilibrium point where the generator sub-network produces image samples which are indistinguishable (from the perspective of the discriminator sub-network) from the genuine image samples.

At least one technical effect of the systems and methods described herein includes the prediction of how damage to equipment will progress or worsen. This prediction can be used to determine whether and/or when to repair the equipment and, in one embodiment, can be used to automatically repair the equipment from a damaged state to a repaired state.

Figure 2:
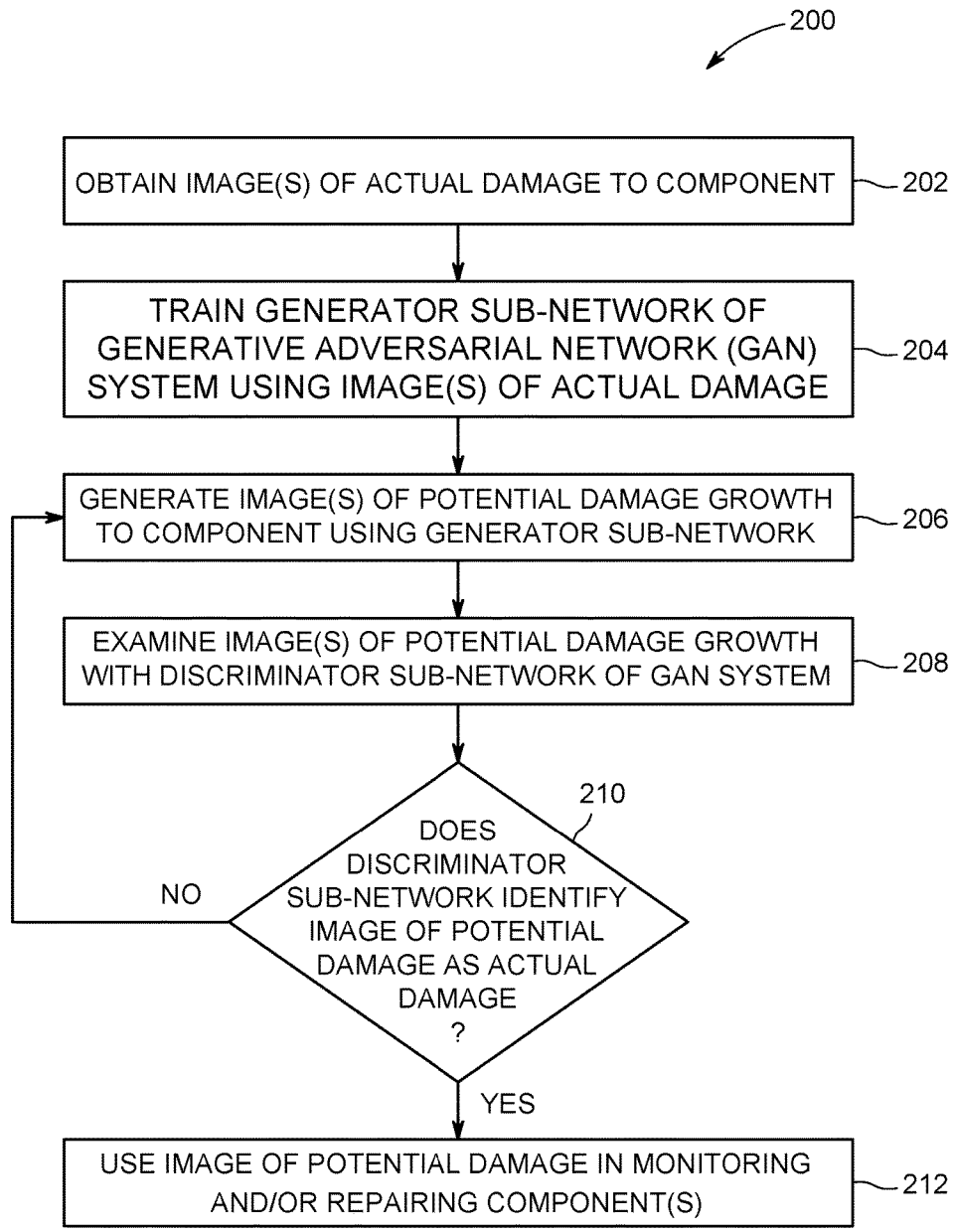
FIG. 2 illustrates a flowchart of one embodiment of a method for predicting progression of damage in equipment based on images.

FIG. 1 illustrates one embodiment of an equipment damage prediction system 100. FIG. 2 illustrates a flowchart of one embodiment of a method 200 for predicting equipment damage progression. The flowchart of the method 200 can represent operations performed by the system 100 shown in FIG. 1, such as functions performed by one or more processors (e.g., one or more microprocessors, field programmable gate arrays, and/or integrated circuits) under the direction of software, to determine or predict optical flow from images. Optionally, the flowchart of the method 200 can represent an algorithm used to create (e.g., write) such software.

The system 100 includes neural networks 102, 104 and, in one embodiment, represents a GAN system. The neural networks 102, 104 are artificial neural networks formed from one or more processors (e.g., microprocessors, integrated circuits, field programmable gate arrays, or the like). The neural networks 102, 104 are divided into two or more layers 106, such as input layers that receive images, output layers that output an image or loss function (e.g., error, as described below), and one or more intermediate layers. The layers 106 of the neural networks 102, 104 represent different groups or sets of artificial neurons, which can represent different functions performed by the processors on the images to predict how damage to equipment will progress over time. The neural network 102 represents a generator sub-network of a GAN, and the neural network 104 represents a discriminator sub-network of the GAN in one embodiment.

In operation, at 202 in the flowchart of the method 200 shown in FIG. 2, the generator sub-network 102 receives images 108 of actual damage 112 to equipment. The equipment (or a component of equipment) can include a surface of a turbine, such as a surface of a turbine blade, nozzle, or the like. Optionally, the equipment can include other components, such as the surface of a road or sidewalk, a surface of a vehicle, or the like, that may be damaged over time. The damage 112 can represent spalling, cracks, rust, pitting, or the like, in the equipment. The images 108 of actual damage 112 can be obtained by one or more cameras generating the images 108 based on equipment that already has the actual damage 112.

The image(s) 108 can be obtained by the generator sub-network 102 by a camera communicating the image(s) 108 to the generator sub-network 102 via one or more wired and/or wireless connections. Optionally, the image(s) 108 can be stored in a tangible and non-transitory computer readable memory, such as a computer hard drive, optical disk, or the like, and be accessible by the generator sub-network 102 via one or more wired and/or wireless connections.

At 204 in the method 200, the generator sub-network 102 is trained using the image(s) 108 of actual damage 112. The processors of the generator sub-network 102 can examine characteristics of pixels 114 in the image(s) 108 of actual damage 112. These characteristics can include locations of the pixels 114 in the image(s) 108, intensities of the pixels 114, colors of the pixels 114, etc. The generator sub-network 102 can determine statistical distributions (e.g., Gaussian distributions) of the pixel characteristics. Different distributions can be determined for different pixels or locations in the image(s) 108. The generator sub-network 102 can examine the statistical distributions and determine probabilities of each pixel 114 having various characteristics.

At 206, one or more images 110 of potential damage 116 to the equipment are generated by the generator sub-network 102. The generator sub-network 102 can generate the created image(s) 110 based on the distributions and probabilities of pixel characteristics that were determined at 204. The generator sub-network 102 creates one or more distribution-based images 110 that are predictions of what other damage 116 to the equipment could look like based on the characteristics of the pixels 114 in the image(s) 108 of actual damage 112 to the equipment. The generator sub-network 102 can create multiple created images 110 of different types of potential damage 116 that could occur to the equipment based on the input image(s) 108 of actual damage 112.

Figure 3:
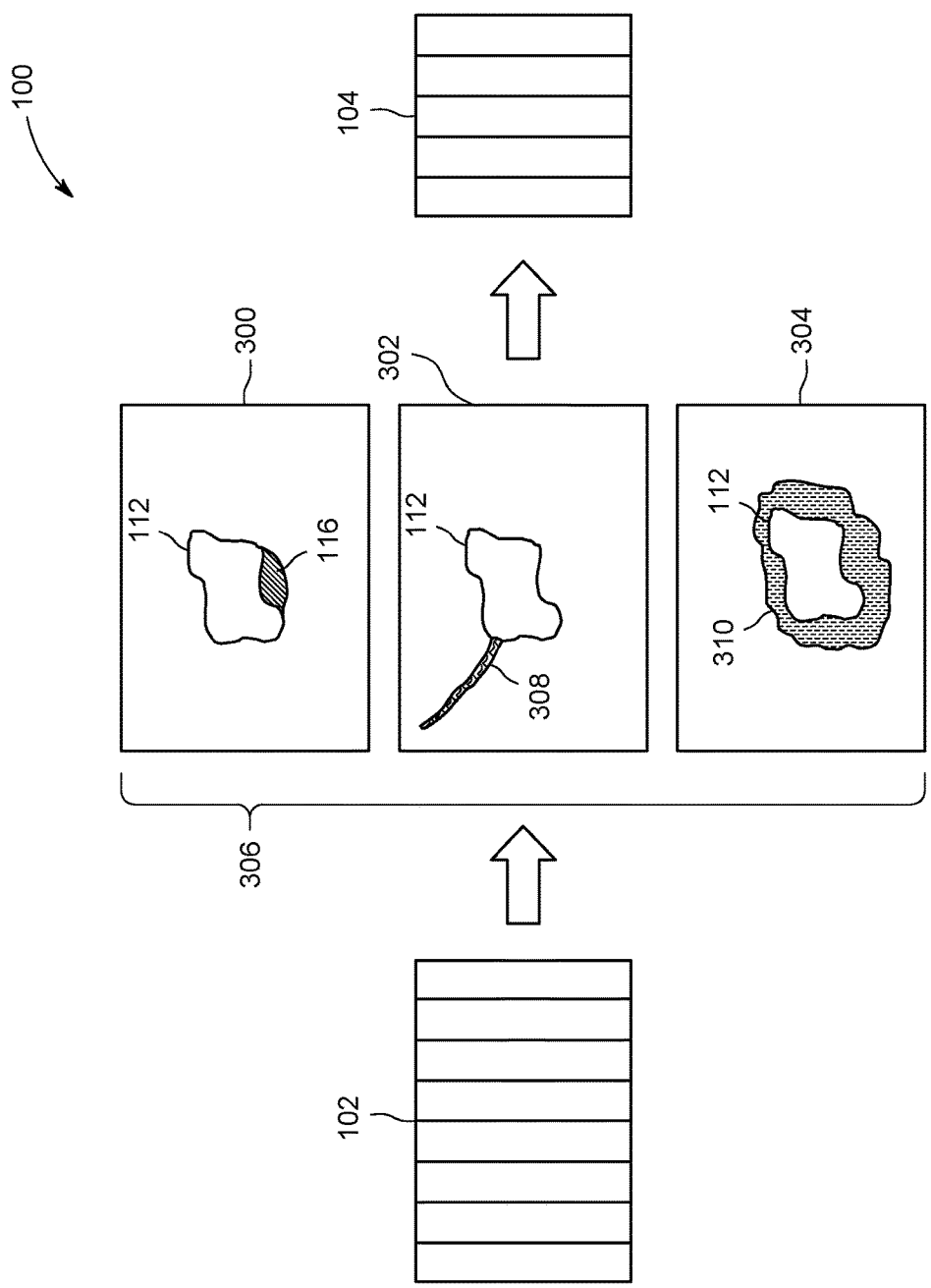
FIG. 3 illustrates a generator sub-network of a generative adversarial network (GAN) system shown in FIG. 1 creating a batch of images of potential damage to equipment.

FIG. 3 illustrates the generator sub-network 102 of the system 100 shown in FIG. 1 creating a batch 306 of images 300, 302, 304 of potential damage 116, 308, 310 to the equipment. The generator sub-network 102 can create multiple distribution-based images 300, 302, 304 based on the characteristics of the images 108 of actual damage 112 that were obtained by or otherwise provided to the generator sub-network 102. As shown in FIG. 3, some of the created images 300, 302, 304 are more likely to represent progression of the damage 112 to the equipment than other created images 300, 302, 304.

For example, the predicted damage 116 appearing in the created image 300 shows growth of the actual damage 112 so that a convex portion of the actual damage 112 is filled with the predicted damage 116. This may be a likely progression of the actual damage 112. As another example, the predicted damage 310 appearing in the created image 304 shows growth of the actual damage 112 along all or substantially all (e.g., at least 75%) of the outer perimeter of the actual damage 112. This also may be a likely progression of the actual damage 112. But, the predicted the predicted damage 308 appearing in the created image 302 shows growth of the actual damage 112 along a singular, narrow extension. This also may not be a likely progression of the actual damage 112.

At 208 in the method 200 shown in FIG. 2, the created image(s) 110, 300, 302, 304 are examined by the discriminator sub-network 104 of the GAN system 100. In one embodiment, the discriminator sub-network 104 determines loss functions or errors for the created images 110, 300, 302, 304. The loss functions or errors can represent a confidence that the potential damage 116, 308, 310 appearing in the created images 110, 300, 302, 304 is likely to occur or develop from the damage 112 shown in the image 108. For example, large loss functions or errors can indicate that the potential damage 116, 308, 310 is less likely to develop from the damage 112 than smaller loss functions or errors.

The discriminator sub-network 104 can determine the loss function, error, and/or confidence value by examining characteristics of the pixels 114 in the created images 110, 300, 302, 304. For example, the discriminator sub-network 104 can determine that the characteristic of a first pixel 114 in a created image 110, 300, 302, 304 is more similar to the distribution of pixel characteristics associated with actual images 108 of damage 112 than a different, second pixel 114 in the created image 110, 300, 302, 304. The first pixel 114 can be associated (by the discriminator sub-network 104) with a greater confidence value (or smaller loss function or error) than the second pixel 114. The confidence values, loss functions, and/or errors can be determined for many or all pixels 114 in a created image 110, 300, 302, 304. Created images 110, 300, 302, 304 having pixels 114 with larger confidence values, smaller loss functions, or smaller errors can be determined by the discriminator sub-network 104 to depict actual or likely progression of damage to the component shown in the image 110, 300, 302, 304 than created images 110, 300, 302, 304 having smaller confidence values, larger loss functions, or larger errors.

In one embodiment, the artificial neurons in the layers 106 of the discriminator sub-network 104 can examine individual pixels 114 in the created images 110, 300, 302, 304. The processors (operating as the artificial neurons) can use linear classification to calculate scores for different categories of objects (referred to herein as "classes"), such as a tree, a car, a person, a bird, spalling of a thermal barrier coating, a crack in a surface, a sign, or the like. These scores can indicate the probability that a pixel 114 represents different classes. Each artificial neuron can apply a mathematical function, such as an activation function, to the same pixel, with the functions applied by different neurons impacting the functions applied by other neurons and different neurons applying different weights to different terms in the functions than one or more, or all other neurons. Application of the functions generates the classification scores for the pixels 114, which can be used to identify the objects in the images 110, 300, 302, 304. The neurons in the layers 106 of the discriminator sub-network 104 examine the characteristics of the pixels 114, such as the intensities, colors, or the like, to determine the scores for the various pixels 114.

For example, the discriminator sub-network 104 can determine that a first pixel 114 in one of the created images 110, 300, 302, 304 has a score vector of [0.6 0.15 0.05 0.2]. This score vector indicates that the discriminator sub-network 104 has calculated a 60% probability that the first pixel 114 represents a first object class (e.g., a human body or person), a 15% probability that the first pixel 114 represents a second object class (e.g., a car), a 5% probability that the first pixel 114 represents a third object class (e.g., a tree), and a 20% probability that the first pixel 114 represents a fourth object class (e.g., the ground). This process can be repeated for several, or all, other pixels 114 in the same image 110, 300, 302, 304.

The processors of the discriminator sub-network 104 can then determine the loss functions or errors for the pixels 114 in the images 110, 300, 302, 304. The loss function or error can be calculated as a difference between a selected object class for a pixel 114 and the object score for that object class. This error value can be a difference between 100% (or one) and the probability of the selected object class. With respect to the preceding example, the first object class is the selected object class for the pixel 114 because the first object class has a larger probability (i.e., 60%) than the other object classes for that same pixel 114. The loss function or error for that pixel 114 can be calculated as [0.4 −0.15 −0.05 −0.2]. The value of 0.4 (or 40%) is calculated as the difference between one and 0.6 (or between 100% and 60%). This process can be repeated for several, or all, of the pixels 114.

At 210 in the method 200, a determination is made as to whether the discriminator sub-network 104 identifies the created image 110, 300, 302, 304 as an image of actual damage to the component. For example, a determination is made as to whether the generator sub-network 102 was able to create an image of potential damage that was determined by the discriminator sub-network 104 to be an actual image of actual damage. The discriminator sub-network 104 can examine the loss functions of the created images 110, 300, 302, 304, compare the loss functions of the created images 110, 300, 302, 304 to each other, compare the loss functions of the created images 110, 300, 302, 304 to thresholds, or the like, to determine which, if any, of the created images 110, 300, 302, 304 appears to show actual damage to the component. The discriminator sub-network 104 can determine that a created image 110, 300, 302, 304 does not depict damage to a component responsive to the loss functions associated with the created image 110, 300, 302, 304 indicating larger error (e.g., relative to a designated threshold). The discriminator sub-network 104 can determine that the potential damage appearing in a created image 110, 300, 302, 304 is similar to actual damage appearing in one or more images 108 responsive to the loss functions associated with the distribution-based image indicating a smaller error (e.g., relative to a designated threshold).

If the discriminator sub-network 104 determines that the potential damage appearing in a created image 110, 300, 302, or 304 is similar to the actual damage appearing in the original image 108 (e.g., the error is not significant), then the potential damage appearing in the image 110, 300, 302, or 304 created by the generator sub-network 102 is a likely growth or progression of the actual damage. As a result, flow of the method 200 can proceed toward 212. But, if the discriminator sub-network 104 determines that the potential damage appearing in the created image 110, 300, 302, or 304 is not similar to the actual damage appearing in the original image 108 (e.g., the error is significant), then the potential damage appearing in the created image 110, 300, 302, or 304 is not an accurate prediction of the progression of damage. As a result, flow of the method 200 can return toward 206. For example, the method 200 can return to creating one or more additional images 110, 300, 302, 304 showing other or different potential damage for examination by the discriminator sub-network 104. Optionally, the method 200 can terminate.

At 212, the image of potential damage is used in monitoring and/or repairing components. For example, additional images of actual damage to the same or other components can be compared with images of potential damage. This comparison can be performed manually or can be performed automatically (e.g., using the discriminator sub-network 104). The image of potential damage (identified at 210) can be used to determine how the actual damage is likely to change over time. If the growth or progression of the damage is sufficiently severe (e.g., the damage growth is larger than a designated threshold), one or more responsive actions can be implemented. For example, an automated system (e.g., a robotic system) can automatically repair the damaged portion of the component, such as by spraying an additive onto a thermal barrier coating on a turbine blade having the damage. As another example, a maintenance schedule of the component can be changed to provide for repair or maintenance sooner (in situations where the likely progression of the damage is more significant) or later (in situations where the likely progression of the damage is less significant).

Figure 4:
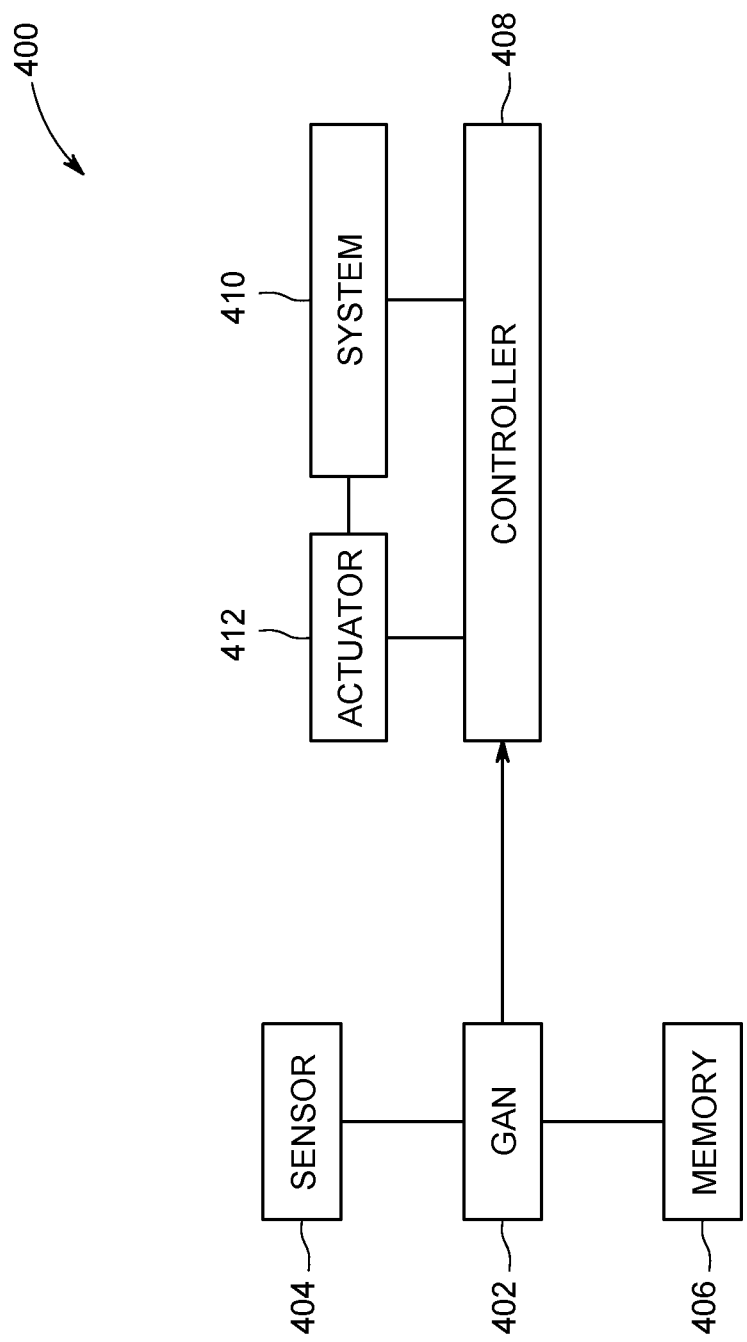
FIG. 4 illustrates one example of a repair system that uses predicted damage progression as determined by a GAN system.

FIG. 4 illustrates one example of a repair system 400 that uses predicted damage progression as determined by a GAN system 402. The GAN system 402 represents one or more embodiments of the system 100 described above. The repair system 400 includes a sensor 404 that obtains images 108 of actual damage 112 to a component (e.g., an engine, turbine, turbine blade, exterior surface of an object, etc.) for the GAN system 402. For example, the sensor 404 can be a camera that provides images or video frames to the GAN system 402 as the images 108. Optionally, the control system 400 includes a memory 406, such as a computer hard drive, optical disc, or the like, that stores the images 108 for the GAN system 402.

The GAN system 402 can predict progression of the actual damage 112 to the component as described above. The predicted damage progression can be communicated to a controller 408 of an automated powered system 410. The controller 408 represents hardware circuitry that includes and/or is connected with one or more processors (e.g., one or more microprocessors, field programmable gate arrays, integrated circuits, etc.). The controller 408 controls operation of the powered system 410, which can represent an automated robotic system that operates to repair the component, such as by spraying an additive onto a coating of the component, by replacing the component, or the like. The controller 408 can examine the predicted damage progression and determine whether one or more responsive actions need to be implemented. For example, if the predicted progression of damage indicates that the component needs to be repaired or replaced, the controller 408 can generate and communication a control signal to an actuator 412 of the powered system 410 that automatically sprays an additive onto a coating of the component, that removes the component, that replaces the component, etc. The actuator 412 can include a spray device, a grasping hand of the powered system 410, or the like.

In one embodiment, a GAN system includes a generator sub-network configured to examine one or more images of actual damage to equipment. The generator sub-network also is configured to create one or more images of potential damage based on the one or more images of actual damage that were examined. The GAN system also includes a discriminator sub-network configured to examine the one or more images of potential damage to determine whether the one or more images of potential damage represent progression of the actual damage to the equipment.

Optionally, the discriminator sub-network is configured to determine one or more loss functions indicative of errors in the one or more images of potential damage.

Optionally, the generator sub-network is configured to be trained using the one or more images of actual damage.

Optionally, the generator sub-network is configured to be trained using the one or more images of actual damage by determining distributions of pixel characteristics of the one or more images of actual damage.

Optionally, the GAN system also includes a controller configured to implement one or more actions responsive to determining that the one or more images of potential damage represent progression of the actual damage.

Optionally, the discriminator sub-network is configured determine whether the one or more images of potential damage represent the progression of the actual damage to the equipment by determining one or more loss functions of the one or more images of potential damage.

Optionally, the discriminator sub-network is configured determine that the one or more images of potential damage represent the progression of the actual damage to the equipment responsive to the one or more loss functions of the one or more images of potential damage not exceeding a designated threshold.

In one embodiment, a method includes examining one or more images of actual damage to equipment using a generator sub-network of a GAN, creating one or more images of potential damage using the generator sub-network based on the one or more images of actual damage that were examined, and determining whether the one or more images of potential damage represent progression of the actual damage to the equipment by examining the one or more images of potential damage using a discriminator sub-network of the GAN.

Optionally, the method also includes determining one or more loss functions indicative of errors in the one or more images of potential damage using the discriminator sub-network.

Optionally, the method also includes training the generator sub-network using the one or more images of actual damage.

Optionally, training the generator sub-network includes determining distributions of pixel characteristics of the one or more images of actual damage.

Optionally, the method also includes implementing one or more actions responsive to determining that the one or more images of potential damage represent progression of the actual damage.

Optionally, determining whether the one or more images of potential damage represent the progression of the actual damage to the equipment includes determining one or more loss functions of the one or more images of potential damage.

Optionally, determining that the one or more images of potential damage represent the progression of the actual damage to the equipment occurs responsive to the one or more loss functions of the one or more images of potential damage not exceeding a designated threshold.

In one embodiment, a GAN system includes a generator sub-network configured to be trained using one or more images of actual damage to equipment. The generator sub-network also is configured to create one or more images of potential damage based on the one or more images of actual damage that were examined. The GAN system also includes a discriminator sub-network configured to examine the one or more images of potential damage to determine whether the one or more images of potential damage represent progression of the actual damage to the equipment.

Optionally, the discriminator sub-network is configured to determine one or more loss functions indicative of errors in the one or more images of potential damage.

Optionally, the generator sub-network is configured to be trained using the one or more images of actual damage by determining distributions of pixel characteristics of the one or more images of actual damage.

Optionally, the system includes a controller configured to implement one or more actions responsive to determining that the one or more images of potential damage represent progression of the actual damage.

Optionally, the discriminator sub-network is configured determine whether the one or more images of potential damage represent the progression of the actual damage to the equipment by determining one or more loss functions of the one or more images of potential damage.

Optionally, the discriminator sub-network is configured determine that the one or more images of potential damage represent the progression of the actual damage to the equipment responsive to the one or more loss functions of the one or more images of potential damage not exceeding a designated threshold.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A repair system comprising:
   a generative adversarial network (GAN) system comprising:
   a generator sub-network configured to examine one or more images of actual damage to equipment, the generator sub-network also configured to create one or more images of potential damage based on the one or more images of actual damage that were examined; and
   a discriminator sub-network configured to examine the one or more images of potential damage to determine whether the one or more images of potential damage represent progression of the actual damage to the equipment,
   the repair system further comprising an automated system for automatically repairing at least one damaged portion of at least one component of the equipment based on the one or more images of potential damage, the automated system comprising a robotic system,
   wherein the at least one component comprises at least one turbine blade, and
   wherein the robotic system sprays an additive onto a thermal barrier coating of the at least one turbine blade.

2. The system of claim 1, wherein the discriminator sub-network is configured to determine one or more loss functions indicative of errors in the one or more images of potential damage,
   wherein the at least one component comprises at least one turbine blade, and
   wherein the robotic system sprays an additive onto a thermal barrier coating of the at least one turbine blade.

3. The system of claim 1, wherein the generator sub-network is configured to be trained using the one or more images of actual damage, and
   wherein a maintenance schedule of the at least one component comprises a first time, the first time comprising an originally scheduled maintenance event, and
   wherein the maintenance schedule is adjusted to provide maintenance at a different time from the first time.

4. The system of claim 3, wherein the generator sub-network is configured to be trained using the one or more images of actual damage by determining distributions of pixel characteristics of the one or more images of actual damage, and
   wherein the maintenance schedule is adjusted to provide maintenance before the first time.

5. The system of claim 3, further comprising a controller configured to implement one or more actions responsive to determining that the one or more images of potential damage represent progression of the actual damage, and
   wherein the maintenance schedule is adjusted to provide maintenance after the first time.

6. The system of claim 1, wherein the discriminator sub-network is configured determine whether the one or more images of potential damage represent the progression of the actual damage to the equipment by determining one or more loss functions of the one or more images of potential damage, and
   wherein the at least one component comprises the equipment.

7. The system of claim 6, wherein the discriminator sub-network is configured determine that the one or more images of potential damage represent the progression of the actual damage to the equipment responsive to the one or more loss functions of the one or more images of potential damage not exceeding a designated threshold.

8. A method comprising:
   examining one or more images of actual damage to equipment using a generator sub-network of a generative adversarial network (GAN);

creating one or more images of potential damage using the generator sub-network based on the one or more images of actual damage that were examined;

determining whether the one or more images of potential damage represent progression of the actual damage to the equipment by examining the one or more images of potential damage using a discriminator sub-network of the GAN, and automatically repairing, using a robotic system, at least one damaged portion of the equipment based on the one or more images of potential damage, wherein the equipment comprises at least one of a surface of a road and a surface of a sidewalk.

9. The method of claim 8, further comprising determining one or more loss functions indicative of errors in the one or more images of potential damage using the discriminator sub-network, wherein different Gaussian distributions are determined for different portions of the one or more images.

10. The method of claim 9, further comprising training the generator subnetwork using the one or more images of actual damage.

11. The method of claim 10, wherein training the generator sub-network includes determining distributions of pixel characteristics of the one or more images of actual damage.

12. The method of claim 8, further comprising implementing one or more actions responsive to determining that the one or more images of potential damage represent progression of the actual damage, wherein the determination of whether the one or more images of potential damage represent progression of the actual damage to the equipment is used to automatically repair the equipment from a damaged state to a repaired state.

13. The method of claim 8, wherein determining whether the one or more images of potential damage represent the progression of the actual damage to the equipment includes determining one or more loss functions of the one or more images of potential damage.

14. The method of claim 13, wherein determining that the one or more images of potential damage represent the progression of the actual damage to the equipment occurs responsive to the one or more loss functions of the one or more images of potential damage not exceeding a designated threshold, and wherein the equipment comprises at least one of a surface of a road, a surface of a sidewalk, and a surface of a vehicle.

15. A repair system comprising:

a generative adversarial network (GAN) system comprising:

a generator sub-network configured to be trained using one or more images of actual damage to equipment, the one or more images comprising one or more pixels, the generator sub-network also configured to create one or more images of potential damage based on the one or more images of actual damage that were examined; and a discriminator sub-network configured to examine the one or more images of potential damage to determine whether the one or more images of potential damage represent progression of the actual damage to the equipment, the repair system further comprising an automated system for automatically repairing at least one damaged portion of the equipment based on the one or more images of potential damage, the automated system comprising a robotic system, wherein the discriminator sub-network classifies the one or more pixels into different categories of objects, and wherein the different categories of objects include at least one of a tree, a car, a person, a bird, spalling of a thermal barrier coating, a sign, and a crack in a surface.

16. The system of claim 15, wherein the discriminator sub-network is configured to determine one or more loss functions indicative of errors in the one or more images of potential damage.

17. The system of claim 15, wherein the generator sub-network is configured to be trained using the one or more images of actual damage by determining distributions of pixel characteristics of the one or more images of actual damage.

18. The system of claim 15, further comprising a controller configured to implement one or more actions responsive to determining that the one or more images of potential damage represent progression of the actual damage.

19. The system of claim 15, wherein the discriminator sub-network is configured determine whether the one or more images of potential damage represent the progression of the actual damage to the equipment by determining one or more loss functions of the one or more images of potential damage.

20. The system of claim 19, wherein the discriminator sub-network is configured determine that the one or more images of potential damage represent the progression of the actual damage to the equipment responsive to the one or more loss functions of the one or more images of potential damage not exceeding a designated threshold, and wherein the different categories of objects include at least one of a tree, a car, a person, a bird, spalling of a thermal barrier coating, and a crack in a surface.

* * * * *